United States Patent
Chen et al.

(10) Patent No.: US 11,876,749 B2
(45) Date of Patent: *Jan. 16, 2024

(54) DCI TRANSMISSION METHOD, TERMINAL, AND BASE STATION

(71) Applicant: VIVO MOBILE COMMUNICATION CO., LTD., Dongguan (CN)

(72) Inventors: Li Chen, Dongguan (CN); Wei Bao, Dongguan (CN); Kai Wu, Dongguan (CN); Xueming Pan, Dongguan (CN); Dajie Jiang, Dongguan (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/099,116

(22) Filed: Jan. 19, 2023

(65) Prior Publication Data

US 2023/0163920 A1 May 25, 2023

Related U.S. Application Data

(63) Continuation of application No. 17/094,289, filed on Nov. 10, 2020, now Pat. No. 11,606,178, which is a continuation of application No. PCT/CN2019/085104, filed on Apr. 30, 2019.

(30) Foreign Application Priority Data

May 10, 2018 (CN) .......................... 201810445110.7

(51) Int. Cl.
*H04L 5/00* (2006.01)
*H04W 4/14* (2009.01)
(Continued)

(52) U.S. Cl.
CPC .............. *H04L 5/0053* (2013.01); *H04W 4/14* (2013.01); *H04W 68/02* (2013.01); *H04W 72/23* (2023.01)

(58) Field of Classification Search
CPC ......... H04L 5/0053; H04L 5/00; H04L 5/005; H04W 4/14; H04W 68/02; H04W 72/23;
(Continued)

(56) References Cited

U.S. PATENT DOCUMENTS 8,467,329 B2   6/2013   Lee et al.
2002/0159426 A1   10/2002   Kanemoto et al.
(Continued)

FOREIGN PATENT DOCUMENTS

CN   1366748 A   8/2002
CN   103428855 A   12/2013
(Continued)

OTHER PUBLICATIONS

International Written Opinion related to Application No. PCT/CN2019/085104; dated Jul. 17, 2019.
(Continued)

*Primary Examiner* — Kiet Tang
(74) *Attorney, Agent, or Firm* — von Briesen & Roper, s.c.

(57) ABSTRACT

A DCI transmission method, a terminal, and a base station are provided. The method includes: receiving DCI, wherein when there is simultaneously in a network a paging message for an idle-state terminal and a change of system information, the DCI carries PDSCH scheduling information for the paging message and a short message; otherwise, the DCI carries the scheduling information or the short message, where the short message is used to indicate the change of system information; and obtaining at least one of the scheduling information or the short message from the DCI.

20 Claims, 5 Drawing Sheets

(51) Int. Cl.
*H04W 68/02* (2009.01)
*H04W 72/23* (2023.01)

(58) Field of Classification Search
CPC ..... H04W 4/12; H04W 48/12; H04W 68/025; H04W 72/12; H04W 76/50; H04W 68/005; H04W 72/042
See application file for complete search history.

(56) References Cited

U.S. PATENT DOCUMENTS

| | | |
|---|---|---|
| 2010/0272017 A1 | 10/2010 | Terry et al. |
| 2011/0103288 A1 | 5/2011 | Lee et al. |
| 2012/0052860 A1* | 3/2012 | Faronius .............. H04W 68/02 455/426.1 |
| 2017/0367070 A1 | 12/2017 | Zhang et al. |
| 2018/0317198 A1 | 11/2018 | Lee et al. |
| 2020/0163050 A1* | 5/2020 | Lee .................. H04W 48/12 |
| 2021/0099973 A1* | 4/2021 | Islam ................ H04L 5/0048 |

FOREIGN PATENT DOCUMENTS

| | | |
|---|---|---|
| CN | 103906085 A | 7/2014 |
| CN | 107529158 A | 12/2017 |
| CN | 110351831 A | 10/2019 |
| WO | 2017079574 A1 | 5/2017 |

OTHER PUBLICATIONS

Extended European Search Report for related Application No. 19799301.7; dated Apr. 13, 2021.
First Chinese Office Action for related Application No. 201810445110.7; dated Apr. 17, 2020.
South Korean Notification of Reason for Refusal for related Application No. 10-2020-7035224; dated Dec. 14, 2021.
United States Non-Final Office Action for related U.S. Appl. No. 17/094,289; dated Apr. 27, 2022.
LG Electronics, "Paging design in NR", Feb. 26-Mar. 2, 2018 3GPP TSG RAN WG1 Meeting #92, Athens, Greece, R1-1802205.
LG Electronics, "Paging design in NR", Apr. 16-20, 2018, 3GPP TSG RAN WG1 Meeting #92bis, Sanya, China, R1-1804537.

* cited by examiner

DCI TRANSMISSION METHOD, TERMINAL, AND BASE STATION

CROSS-REFERENCE TO RELATED APPLICATIONS

This application is a continuation application of U.S. patent application Ser. No. 17/094,289 filed on Nov. 10, 2020, which is a continuation application of PCT International Application No. PCT/CN2019/085104 filed on Apr. 30, 2019, which claims priority to Chinese Patent Application No. 201810445110.7 filed in China on May 10, 2018. All of the disclosures are incorporated herein by reference in their entireties.

TECHNICAL FIELD

This disclosure relates to the field of communications technologies, and in particular, to a downlink control information (Downlink Control Information, DCI) transmission method, a terminal, and a base station.

BACKGROUND

In a new radio (New Radio, NR) system, states of a terminal include a connected state, an idle state, and an inactive state, and an update notification of system information may be transmitted on a physical downlink shared channel (Physical Downlink Shared Channel downlink, PDSCH), or may be transmitted on a physical downlink control channel (Physical Downlink Control Channel, PDCCH). However, in a communications system of related technologies, update notifications of system information are transmitted on different channels for terminals in different states. For example, an update notification of system information is transmitted on a PDSCH to ensure performance of a terminal in an idle state, and an update notification of system information is transmitted on a PDCCH to ensure performance of a terminal in a connected state. In this way, update notifications of system information need to be separately transmitted on the PDSCH and the PDCCH, resulting in relatively large signaling transmission overheads.

SUMMARY

Embodiments of this disclosure provide a DCI transmission method, a terminal, and a base station, so as to resolve the problem of relatively large signaling transmission overheads.

According to a first aspect, an embodiment of this disclosure provides a DCI transmission method, applied to a terminal and including:

receiving DCI, where when there is simultaneously in a network a paging message for an idle-state terminal and a change of system information, the DCI carries PDSCH scheduling information for the paging message and a short message; otherwise, the DCI carries the scheduling information or the short message, where the short message is used to indicate the change of system information; and obtaining at least one of the scheduling information or the short message from the DCI.

According to a second aspect, an embodiment of this disclosure provides a DCI transmission method, applied to a base station and including:

generating DCI, where when there is simultaneously in a network a paging message for an idle-state terminal and a change of system information, the DCI carries PDSCH scheduling information for the paging message and a short message; otherwise, the DCI carries the scheduling information or the short message, where the short message is used to indicate the change of system information; and transmitting the DCI on a PDCCH.

According to a third aspect, an embodiment of this disclosure provides a terminal, including:

a receiving module, configured to receive DCI, where when there is simultaneously in a network a paging message for an idle-state terminal and a change of system information, the DCI carries PDSCH scheduling information for the paging message and a short message; otherwise, the DCI carries the scheduling information or the short message, where the short message is used to indicate the change of system information; and an obtaining module, configured to obtain at least one of the scheduling information or the short message from the DCI.

According to a fourth aspect, an embodiment of this disclosure provides a base station, including:

a generation module, configured to generate DCI, where when there is simultaneously in a network a paging message for an idle-state terminal and a change of system information, the DCI carries PDSCH scheduling information for the paging message and a short message; otherwise, the DCI carries the scheduling information or the short message, where the short message is used to indicate the change of system information; and a transmission module, configured to transmit the DCI on a PDCCH.

According to a fifth aspect, an embodiment of this disclosure provides a terminal, including a memory, a processor, and a computer program stored in the memory and capable of running on the processor, where when the computer program is executed by the processor, the steps of the DCI transmission method on a terminal side provided in the embodiments of this disclosure are implemented.

According to a sixth aspect, an embodiment of this disclosure provides a base station, including a memory, a processor, and a computer program stored in the memory and capable of running on the processor, where when the computer program is executed by the processor, the steps of the DCI transmission method on a base station side provided in the embodiments of this disclosure are implemented.

According to a seventh aspect, an embodiment of this disclosure provides a computer-readable storage medium, where the computer-readable storage medium stores a computer program, and when the computer program is executed by a processor, the steps of the DCI transmission method on a terminal side provided in the embodiments of this disclosure are implemented, or when the computer program is executed by a processor, the steps of the DCI transmission method on a base station side provided in the embodiments of this disclosure are implemented.

In the embodiments of this disclosure, the DCI is received, where when there is simultaneously in the network the paging message for the idle-state terminal and the change of system information, the DCI carries the PDSCH scheduling information for the paging message and the short message; otherwise, the DCI carries the scheduling information or the short message, where the short message is used to indicate the change of system information. At least one of the scheduling information or the short message is obtained from the DCI. This can reduce signaling transmission overheads.

DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

In the specification and claims of this application, the terms "include", "comprise", and any other variants thereof are intended to cover the non-exclusive inclusion. For example, a process, method, system, product, or device that includes a list of steps or units is not necessarily limited to those expressly listed steps or units, but may include other steps or units not expressly listed or inherent to such process, method, system, product, or device. In addition, in the specification and claims, the use of "and/or" represents presence of at least one of the connected objects. For example, "A and/or B" indicates that the following three cases: only A, only B, or both A and B.

In the embodiments of this disclosure, the terms "exemplary" or "for example" are used to represent an example, an illustration, or a description. Any embodiment or design solution described as "exemplary" or "for example" in the embodiments of this disclosure should not be construed as preferred or advantageous over other embodiments or design solutions. To be precise, the terms such as "exemplary" or "for example" are intended to present a related concept in a specific manner.

The following describes the embodiments of this disclosure with reference to the accompanying drawings. A DCI transmission method, a terminal, and a base station provided in the embodiments of this disclosure may be applied to a wireless communications system. The wireless communications system may be a 5G system, or an evolved long term evolution (Evolved Long Term Evolution, eLTE) system, or a later evolved communications system.

Figure 1:
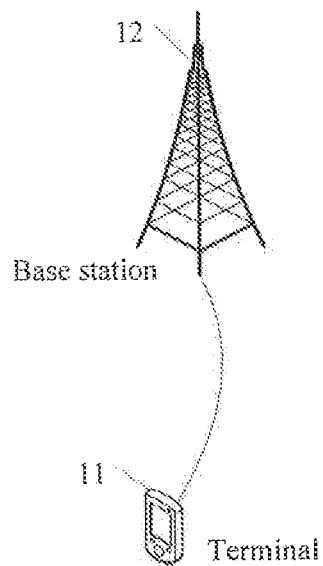
FIG. 1 is a structural diagram of a network system to which embodiments of this disclosure are applicable.

Referring to FIG. 1, FIG. 1 is a structural diagram of a network system to which the embodiments of this disclosure are applicable. As shown in FIG. 1, the network system includes a terminal 11 and a base station 12. The terminal 11 may be user equipment (User Equipment, UE) or other terminal-side devices such as a mobile phone, a tablet personal computer (Tablet Personal Computer), a laptop computer (Laptop Computer), a personal digital assistant (personal digital assistant, PDA), a mobile Internet device (Mobile Internet Device, MID), or a wearable device (Wearable Device). It should be noted that the terminal 11 is not limited to any specific type in the embodiments of this disclosure. The base station 12 may be a 4G base station, or a 5G base station, or a base station of a later version, or a base station in another communications system, or is referred to as a node B, an evolved node B, or other terms in the field. The base station is not limited to a specific technical term provided that a same technical effect is achieved. In addition, the base station 12 may be a master node (Master Node, MN) or a secondary node (Secondary Node, SN). It should be noted that the 5G base station is merely used as an example in the embodiments of this disclosure, rather than limiting the specific type of the base station.

Figure 2:
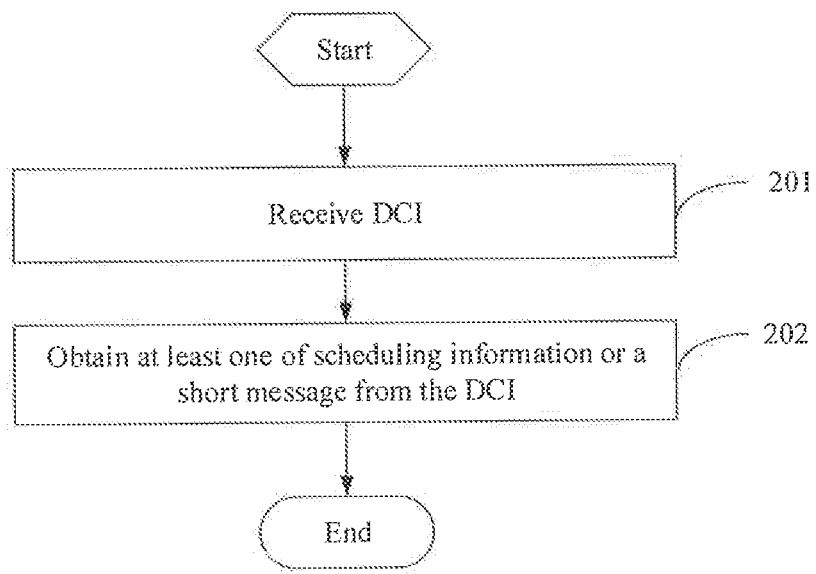
FIG. 2 is a flowchart of a DCI transmission method according to an embodiment of this disclosure.

Referring to FIG. 2, FIG. 2 is a flowchart of a DCI transmission method according to an embodiment of this disclosure. The method is applied to a terminal, and the terminal may be a connected-state terminal, an idle-state terminal or an inactive-state terminal. As shown in FIG. 2, the method includes the following steps.

Step 201: Receive DCI, where when there is simultaneously in a network a paging message for an idle-state terminal and a change of system information, the DCI carries PDSCH scheduling information for the paging message (Paging PDSCH scheduling) and a short message (short message); otherwise, the DCI carries the scheduling information or the short message, where the short message is used to indicate the change of system information.

The receiving DCI may be receiving the DCI on a PDCCH, and specifically, may be that a base station transmits the DCI on the PDCCH.

That when there is simultaneously in the network the paging message for the idle-state terminal and the change of system information, the DCI carries the PDSCH scheduling information for the paging message and the short message; otherwise, the DCI carries the scheduling information or the short message may be that: when there is simultaneously in the network the paging message for the idle-state terminal and the change of system information, the DCI carries the scheduling information and the short message; when there is only the paging message for the idle-state terminal in the network, the DCI carries the scheduling information; and when there is only the change of system information in the network, the DCI carries the short message. That there is simultaneously in the network the paging message for the idle-state terminal and the change of system information may be that there is simultaneously the paging message and the change of system information for the base station or the base station needs to simultaneously send the paging message and the change of system information; or may be that there is the change of system information after the base station has sent the paging message, or when the base station is sending the paging message, or when the base station is to send the paging message.

The paging message may be a paging message for the idle-state terminal or the inactive-state terminal. In this case, a PDSCH of the paging message may also be referred to as a PDSCH corresponding to the paging message, and the scheduling information may include at least one of the following:

frequency domain resource (Frequency domain resource) information, time domain resource (Time domain resource) information, mapping information between a virtual resource block (Virtual Resource Block, VRB) and a physical resource block (physical resource block, PRB), modulation and coding scheme (modulation and coding scheme), transport block scaling (Transport Block scaling, TB scaling), or reserved bits (bit), where the TB scaling may be 2 bits, and the reserved bits may be 15 bits, which are not limited.

The change of system information may include at least one of a change of ordinary system information or a change of public safety system information. In addition, if the short message has remaining bits, the remaining bits are reserved bits. The remaining bits herein are bits other than those indicating the change of system information and the change of public safety system information.

It should be noted that in this embodiment of this disclosure, the ordinary system information may also be referred to as system information, and the ordinary system information may be system information other than the public safety system information. The public safety system information may include at least one of earthquake and tsunami warning system (Earthquake and Tsunami Warning System, ETWS) information or commercial mobile alert service (Commercial Mobile Alert Service, CMAS) information.

In addition, in this embodiment of this disclosure, the short message may include M bits, and the M bits may be used to indicate the change of system information, and M is an integer greater than 0. The change of system information may include at least one of the following:

whether all system information (referred to as the ordinary system information) has changed, whether all system information (including the public safety system information and the ordinary system information) has changed, whether all system information except a master information block (Master Information Block, MIB) has changed, whether all system information except the MIB and system information block (System information Block, SIB) 1 has changed, whether per-SIB (per-SIB) messages have changed, whether per system information messages (per-SI message) have changed, or whether the public safety system information (CMAS and/or ETWS) has changed. In addition, the rest are reserved bits. The SI described above stands for system information (System Information).

It should be noted that in this embodiment of this disclosure, the change of system information may also be referred to as an alteration of system information.

Step 202: Obtain at least one of the scheduling information or the short message from the DCI.

In this step, at least one of the scheduling information or the short message may be obtained by parsing (or demodulating) the DCI. For example, if the DCI carries the scheduling information and the short message, the scheduling information and the short message are obtained in step 202. If the DCI carries the scheduling information or the short message, the scheduling information or the short message is obtained in step 202.

In the foregoing method, because there is simultaneously in the network the physical downlink shared channel PDSCH scheduling information for the paging message and the change of system information, the DCI carries the scheduling information and the short message. In this way, in a case in which updating the system information and paging the idle-state terminal take place at the same time, the PDSCH scheduling information for the paging message and the short message are carried in the DCI, thereby reducing a delay for paging the idle-state terminal and also reducing a delay for obtaining an update indication of system information by the idle-state terminal and the connected-state terminal. When updating of the system information and paging of the idle-state terminal do not occur at the same time, the PDSCH scheduling information for the paging message or the short message may be carried in DCI, so as to transmit the scheduling information or indicate the change of system information. In addition, carrying at least one of the scheduling information or the short message in the DCI can meet requirements of both the connected-state terminal and the idle-state terminal, because both the connected-state terminal and the idle-state terminal are capable of demodulating the DCI. Certainly, this embodiment of this disclosure may also be applied to the inactive-state terminal, with the same beneficial effect achieved.

In addition, in this embodiment of this disclosure, the scheduling information carried in the DCI may be referred to as a scheduling information field, and the short message carried in the DCI may be referred to as a short message field. The DCI may further include a reserved field, and the reserved field includes reserved bits. Certainly, this is not limited thereto, because the DCI may further include a header (header) field or an indication field in some implementations. In addition, in this embodiment of this disclosure, because the short message is used to indicate the change of system information, the short message may also be referred to as another name, for example, change indication information of system information.

It should be noted that the foregoing method provided in this embodiment of this disclosure may be applied to a 5G NR system, which, however, is not limited thereto. The method can be applied to other communications systems provided that the same functions can be implemented, for example, applied to a 4G or 6G system or other communications systems to which the change of system information and transmission of the scheduling information are applied.

In this embodiment of this disclosure, the DCI is received. The DCI carries at least one of the PDSCH scheduling information for the paging message or the short message, and the short message is used to indicate the change of system information. At least one of the scheduling information or the short message is obtained from the DCI. This can reduce signaling transmission overheads, and can also achieve the effects of reducing a delay for obtaining an update indication of system information by the idle-state terminal and the connected-state terminal, and further reducing a delay for paging the idle-state terminal.

Figure 3:
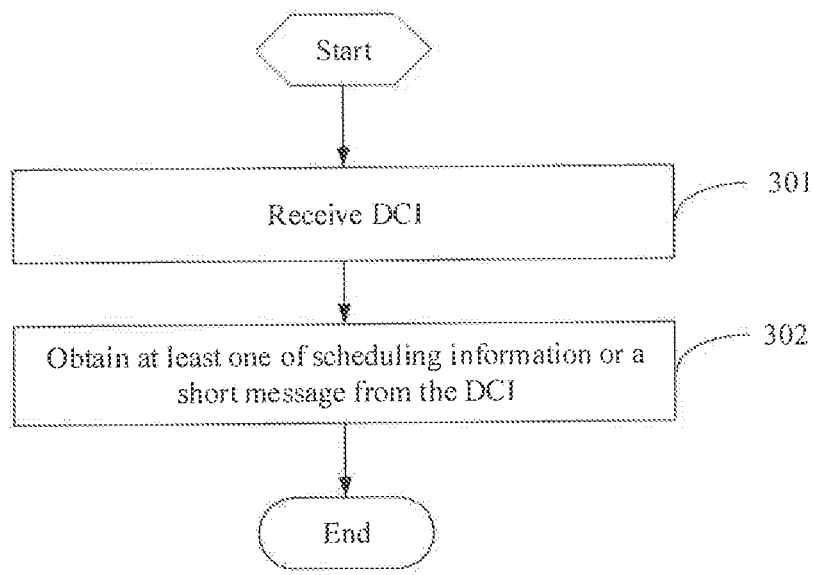
FIG. 3 is a flowchart of another DCI transmission method according to an embodiment of this disclosure.

Referring to FIG. 3, FIG. 3 is a flowchart of another DCI transmission method according to an embodiment of this disclosure. The method is applied to a terminal, and as shown in FIG. 3, includes the following steps.

Step 301: Receive DCI, where when there is simultaneously in a network a paging message for an idle-state terminal and a change of system information, the DCI carries PDSCH scheduling information for the paging message and a short message; otherwise, the DCI carries the scheduling information or the short message, where the short message is used to indicate the change of system information; and the DCI further includes indication information and the indication information is used to indicate content carried in the DCI.

The indication information may be used to indicate whether the DCI carries the scheduling information and/or carries the short message. In this way, the indication information allows the terminal to know content carried in the DCI, so that the terminal can demodulate the DCI based on a requirement of the terminal, thereby reducing power consumption of the terminal. For example, when the indication information indicates that the DCI carries no short message, and a connected-state terminal does not require the scheduling information, the scheduling information may not be obtained to reduce power consumption of the terminal.

In an optional implementation, the DCI includes a header field, and the header field includes the indication information.

The indication information indicates that the DCI carries at least one of the scheduling information or the short message; or a portion of bits in the indication information is used to indicate whether the DCI carries the scheduling information, and the other portion of bits is used to indicate whether the DCI carries the short message.

Figure 4:
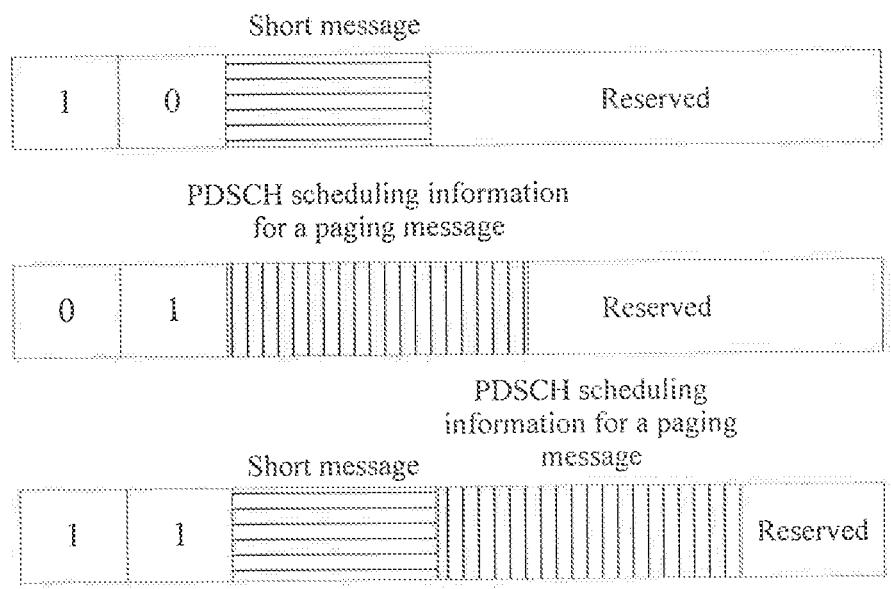
FIG. 4 is a schematic diagram of DCI according to an embodiment of this disclosure.

That the indication information indicates that the DCI carries at least one of the scheduling information or the short message may be that the indication information indicates, by using a code point, that the DCI carries at least one of the scheduling information or the short message, or may be that the indication information indicates, in a joint coding manner, that the DCI carries at least one of the scheduling information or the short message. In addition, the indication information may be indication information of N bits, where N is a positive integer. For example, N is 2. As shown in FIG. 4, the indication information is 10, indicating that DCI carries the short message, 01 indicates that the DCI carries the scheduling information, and 11 indicates that the DCI carries the scheduling information and the short message. Indicating, by using the indication information, that the DCI carries at least one of the scheduling information or the short message can reduce code points of the indication information. For example, indicating the scheduling information or the short message requires only three code points, so that another code point (for example, 00) may be reserved for indicating other cases (case) later.

Figure 5:
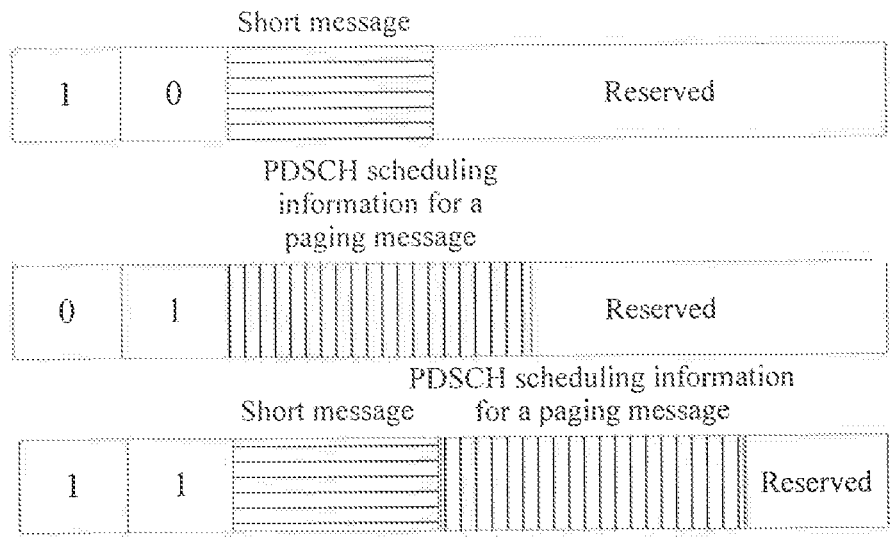
FIG. 5 is a schematic diagram of another type of DCI according to an embodiment of this disclosure.

That a portion of bits in the indication information is used to indicate whether the DCI carries the scheduling information, the other portion of bits is used to indicate whether the DCI carries the short message may be that the indication information includes two parts of bits, one part is used to indicate whether the DCI carries the scheduling information, and the other part is used to indicate whether the DCI carries the short message. For example, the indication information is N bits, where N is 2. As shown in FIG. 5, the first bit is used to indicate whether the DCI carries the short message. When the first bit is 1, it indicates that the DCI carries the short message; when the first bit is 0, it indicates that the DCI carries no short message. The second bit is used to indicate whether the DCI carries the scheduling information. When the second bit is 1, it indicates that the DCI carries the scheduling information; when the first bit is 0, it indicates that the DCI does not carry the scheduling information. In this way, the scheduling information and the short message can each be indicated by using a dedicated bit, reducing complexity.

In addition, it should be noted that, in this embodiment of this disclosure, locations of the scheduling information and the short message in the DCI are not limited, which, for example, may be locations shown in FIG. 4 and FIG. 5, or may be that the scheduling information is in the front and the short message is in the back.

In the foregoing implementation, the DCI may include a header field (header field)+a short message field and/or a paging PDSCH scheduling field+a reserved field, where the short message field and/or the paging PDSCH scheduling field indicates that the DCI includes at least one of the short message field or the scheduling field.

For example, in one manner, a header composed of N bits (which may use joint coding) is used to indicate which kind of information is carried behind the header:

A. Short message. That is, M bits are used to indicate the change of system information. The change of system information includes at least one of the following: whether all system information (referred to as ordinary system information) has changed, whether all system information (including public safety system information) has changed, whether all system information except an MIB has changed, whether all system information except the MIB and SIB 1 has changed, whether per-SIB messages have changed, whether per-SI messages have changed, or whether the public safety system information (CMAS and/or ETWS) has changed. The rest are reserved bits.

B. K bits, indicating that the PDSCH scheduling information for the paging message is carried. Further, the scheduling information may carry indication information used for indicating whether the paging message carries a change indication of system information, where K is an integer greater than or equal to 1.

C. Both the short message and the paging PDSCH scheduling information are carried.

For example, when N=2, as shown in FIG. 4, the two bits indicate at least one of the scheduling information or the short message, where a code point 00 is reserved for indicating other cases (case) later.

For another example, in another scheme, the N bits in the header field each are used to indicate which kind of information is carried behind the header:

A. As shown in FIG. 5, one bit indicates whether the short message is present behind the header.

B. As shown in FIG. 5, one bit indicates whether the PDSCH scheduling information corresponding to the paging message is present behind.

In the foregoing two schemes, the locations of the short message (short message) and the PDSCH scheduling information for the paging message (Paging PDSCH scheduling) may alternatively be changed.

In another optional implementation, the DCI carries the short message, and the indication information is used to indicate whether the DCI carries the scheduling information.

The short message may be M bits, and M is an integer greater than or equal to 1. For details of the short message, reference may be made to the description of the foregoing implementation. Details are not described herein again.

Figure 6:
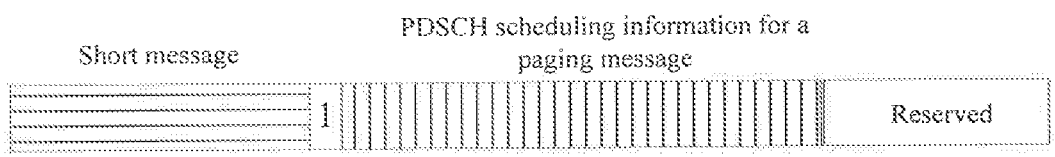
FIG. 6 is a schematic diagram of another type of DCI according to an embodiment of this disclosure.

The indication information may be one bit. For example, as shown in FIG. 6, 1 indicates that the scheduling information is carried, and 0 indicates that the scheduling information is not carried. Certainly, in this embodiment of this disclosure, a quantity of bits of the indication information is not limited. For example, the indication information may be N bits, where N is an integer greater than or equal to 1.

It should be noted that, as shown in FIG. 6, the indication information may be located after the short message and before the scheduling information. However, in this embodiment of this disclosure, the locations of the short message and the scheduling information are not limited, and a location of the indication information is neither limited. For example, the indication information may be at the last location of the DCI or before the reserved bits.

In this implementation, the indication information merely needs to indicate whether the scheduling information is carried, thereby reducing overheads of the DCI.

Optionally, in this implementation, the DCI includes K1 bits. If the indication information indicates that the DCI carries the scheduling information, the K1 bits are used to indicate the scheduling information. If the indication information indicates that the DCI does not carry the scheduling information, the K1 bits are reserved bits, where K1 is an integer greater than or equal to 1.

In this way, the reserved bits of the DCI can be used properly to indicate the scheduling information, thereby reducing overheads of the DCI. Furthermore, an effect of lower complexity is achieved because it is not necessary to design new-format DCI.

In the foregoing implementation, the header field may be removed, and the DCI includes a short message field+a scheduling indication field and/or a paging PDSCH scheduling field+a reserved field, where the scheduling indication field includes the indication information for indicating whether the DCI carries the scheduling information.

In one scheme, the DCI may specifically include:

a. M bits used for indicating the change of system information. For details, reference may be made to the M bits described in the foregoing embodiment.

b. H1 bits used for indicating whether the paging PDSCH scheduling information is carried behind, where H1 may be optionally one bit.

c. If it is indicated that the paging PDSCH scheduling information is carried, K bits indicate that the PDSCH scheduling information for the paging message is carried. A code point (code point) of the K bits does not need to be reserved for indicating absence of the scheduling information. If it is indicated that the paging PDSCH scheduling information is not carried, all subsequent bits are reserved bits.

In another optional implementation, the DCI includes a header field, the header field includes the indication information, and the indication information is used to indicate that the DCI carries one of the short message and the scheduling information; and if the DCI further carries the other one of the short message and the scheduling information, the other one of the short message and the scheduling information is indicated by using Kx bits in the DCI, where Kx is an integer greater than or equal to 1.

In this implementation, the header field may be used to indicate that the DCI carries the short message or the scheduling information. When the DCI carries both the short message and the scheduling information, the Kx bits are used to indicate content not indicated by the header field. In this way, the overheads of the DCI can be reduced because the header field can indicate, by using one bit, whether the DCI carries the short message or the scheduling information. In addition, because other content is not indicated, complexity of the DCI can be further reduced.

The following describes four optional implementations by using examples.

In an optional implementation, if the indication information indicates that the DCI carries the short message, and the K2 bits in the DCI are not a specific code point, the K2 bits are used to indicate the scheduling information. If the K2 bits are the specific code point, it indicates that the DCI does not carry the scheduling information, where K2 is an integer greater than or equal to 1.

In this implementation, when the indication information indicates that the DCI carries the short message, the K2 bits may be used to indicate the scheduling information or indicate that the DCI does not carry the scheduling information. The specific code point may be pre-configured, protocol-defined, or configured for the terminal by a network side. For example, the K2 bits are all 0s.

In this implementation, the specific code point is used to indicate whether the scheduling information is carried, and when the K2 bits are not the specific code point, the K2 bits are used to indicate the scheduling information, thereby reducing the overheads of the DCI, without the need to use additional bits to indicate whether the scheduling information is carried.

In this implementation, the DCI may include a header field+a short message field and/or a paging PDSCH scheduling field+an indication field+a reserved field. It should be noted that the indication field herein represents the K2 bits when the K2 bits are the specific code point, and the scheduling field represents the K2 bits when the K2 bits are not the specific code point.

For example, the DCI may specifically include:

a. a header field of N1 bits, indicating whether the short message or the PDSCH scheduling information for the paging message is carried behind.

b. If the short message is carried, c is interpreted as follows:

c. In the reserved bits after the short message, K bits are used to indicate that the PDSCH scheduling information for the paging message is carried. One code point (code point) of the K bits is reserved to indicate that the PDSCH scheduling information for the paging message is not carried. For example, the K bits being all 0s are reserved to indicate that the PDSCH scheduling information for the paging message is not carried.

In an optional implementation, if the indication information indicates that the DCI carries the short message, the DCI includes a first indication bit, where the first indication bit is used to indicate whether the DCI carries the scheduling information; if the first indication bit indicates that the DCI carries the scheduling information, K3 bits in the DCI are used to indicate the scheduling information, where K3 is an integer greater than or equal to 1.

In this implementation, the indication information may indicate that the DCI carries the short message, and a first indication bit is used to indicate whether the DCI carries the scheduling information. If the DCI carries the scheduling information, the K3 bits are used to indicate the scheduling information. The first indication bit may be one bit. For example, 1 indicates that the scheduling information is carried, and 0 indicates that the scheduling information is not carried. Certainly, a quantity of bits and a location of the first indication bit are not limited.

In this way, the first indication bit is specially used to indicate whether the DCI carries the scheduling information, thereby reducing complexity of the DCI.

In this implementation, the DCI may include: a header field+a short message field and/or a paging PDSCH scheduling field+an indication field+a reserved field.

For example, the DCI may specifically include:

a. a header field of N1 bits, indicating whether the short message or the PDSCH scheduling information for the paging message is carried behind, for example, one bit.

b. If the short message is carried, c and d are interpreted as follows:

c. In the reserved bits after the short message, K bits are used to indicate that the PDSCH scheduling information for the paging message is carried.

d. N2 bits are used after the short message to indicate whether the PDSCH scheduling information for the paging message is carried, where the N2 bits may be at any location after the short message, for example, N2=1 bit.

In an optional implementation, if the indication information indicates that the DCI carries the scheduling information, M1 bits in the DCI are used to indicate the short message, where M1 is an integer greater than or equal to 1.

In this implementation, when the DCI carries the scheduling information and the short message, whether the DCI carries the scheduling information is merely indicated by using the indication information, thereby reducing overheads of the DCI.

In this implementation, the DCI may include: a header field+a short message field and/or a paging PDSCH scheduling field+a reserved field.

For example, the DCI may specifically include:

a. a header field of N1 bits, indicating whether the short message or the PDSCH scheduling information for the paging message is carried behind.

b. If the PDSCH scheduling information for the paging message is carried, c is interpreted as follows:

c. In the reserved bits after the scheduling information, M bits are used to indicate an update of system information.

In an optional implementation, if the indication information indicates that the DCI carries the scheduling information, the DCI includes a second indication bit, where the second indication bit is used to indicate whether the DCI carries the short message; and if the second indication bit indicates that the DCI carries the short message, M2 bits in the DCI are used to indicate the short message, where M2 is an integer greater than or equal to 1.

In this implementation, the indication information may indicate that the DCI carries the scheduling information, the second indication bit is used to indicate whether the DCI carries the short message, and if the DCI carries the short message, the M2 bits are used to indicate the short message. The second indication bit may be one bit. For example, 1 indicates that the short message is carried, and 0 indicates that the short message is not carried. Certainly, a quantity of bits and a location of the second indication bit are not limited.

In this way, the second indication bit is specially used to indicate whether the DCI carries the short message, thereby reducing complexity of the DCI.

In this implementation, the DCI may include: a header field+a short message field and/or a paging PDSCH scheduling field+an indication field+a reserved field.

For example, the DCI may specifically include:

a. a header field of N1 bits, for example, one bit, indicating whether the short message or the PDSCH scheduling information for the paging message is carried behind.

b. If the PDSCH scheduling information for the paging message is carried, c and d are interpreted as follows:

c. In the reserved bits after the scheduling information, M bits are used to indicate an update of system information.

d. H2 bits are used after the scheduling information to indicate whether an update of the system information is carried. The H2 bits may be at any location behind the scheduling information, for example, H2=1 bit. It should be noted that the H2 bits herein is the second indication bit.

Step 302: Obtain at least one of the scheduling information or the short message from the DCI.

It should be noted that in this embodiment, in some implementations, the DCI may alternatively not include the indication information in step 301.

For example, in an optional implementation, the DCI carries the short message, and the DCI further includes K4 bits; if the K4 bits are not a specific code point, the K4 bits are used to indicate the scheduling information; and if the K4 bits are the specific code point, it indicates that the DCI does not carry the scheduling information, where K4 is an integer greater than or equal to 1.

In this implementation, when the DCI carries the short message, K4 bits are used to indicate the scheduling information, and the K4 bits are the specific code point, indicating that the DCI does not carry the scheduling information, thereby reducing overheads of the DCI. The specific code point may be pre-configured by the terminal, predefined in the protocol, or pre-configured for the terminal by the network side. For example, the K4 bits are all 0s.

Figure 7:
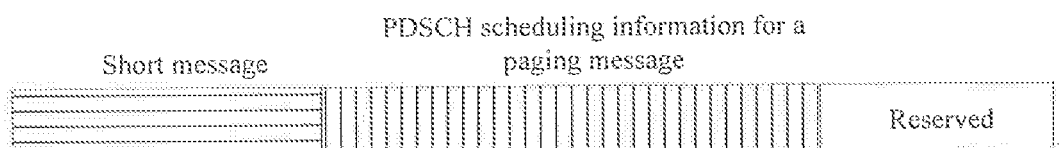
FIG. 7 is a schematic diagram of another type of DCI according to an embodiment of this disclosure.

In this implementation, the header field may be removed and the DCI includes a short message field and/or a paging PDSCH scheduling field+a reserved field, for example, as shown in FIG. 7.

In one scheme, the DCI may specifically include:

a. M bits, used for indicating the change of system information. For the M bits herein, reference may be made to the description of the foregoing implementation. Details are not described herein again.

B. K bits, indicating that the PDSCH scheduling information for the paging message is carried. One code point (code point) of the K bits is reserved to indicate that the PDSCH scheduling information for carrying the paging message is not present behind. For example, the K bits being all 0s are used to indicate that the PDSCH scheduling information for the paging message is not carried.

It should be noted that, in this embodiment of this disclosure, K, K1, K2, K3, K4, and Kx may be the same value or certainly may be different values, which is not limited. Similarly, M1 and M2 may be the same value or certainly may be different values, which is not limited.

Optionally, in this embodiment of this disclosure, remaining bits in the DCI are reserved bits (Reserved bits). The remaining bits herein may be bits not defined in the DCI in this embodiment of this disclosure, for example, the reserved (Reserved) field shown in FIG. 4 to FIG. 7.

Optionally, in this embodiment of this disclosure, the scheduling information or the DCI carries indication information, and the indication information is used to indicate whether the paging message carries a change indication of system information.

Because the scheduling information or the DCI may indicate whether the paging message carries the change indication of system information, the terminal can quickly determine whether the paging message carries the change indication of system information, thereby improving working efficiency of the terminal and reducing a delay.

In this embodiment of this disclosure, a plurality of optional implementations are added on a basis of the embodiment shown in FIG. 1. In addition, signaling transmission overheads can be reduced, and the following beneficial effects can be achieved: a delay for obtaining the update indication of system information by the idle-state terminal and the connected-state terminal can be reduced, and a delay for paging the idle-state terminal can be reduced. It can be implemented that the DCI includes but is not limited to the following DCI formats:

a header field+a short message and/or a paging PDSCH scheduling field;

a short message field and/or a paging PDSCH scheduling field+a reserved field;

a short message field+a scheduling indication field and/or a paging PDSCH scheduling field+a reserved field; and a header+a short message field and/or a paging PDSCH scheduling field+an indication field+a reserved field.

The short message and/or the paging PDSCH scheduling field indicates that the DCI includes at least one of the short message or the paging PDSCH scheduling field.

Figure 8:
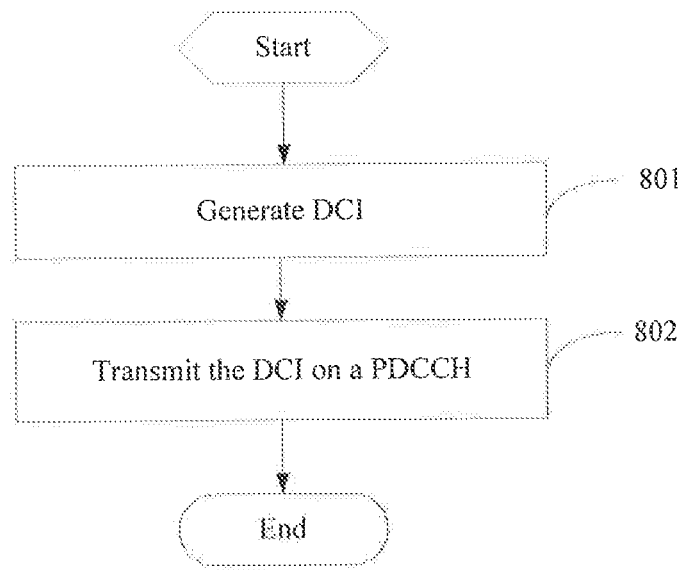
FIG. 8 is a flowchart of another DCI transmission method according to an embodiment of this disclosure.

Referring to FIG. 8, FIG. 8 is a flowchart of another DCI transmission method according to an embodiment of this disclosure. The method is applied to a base station, and as shown in FIG. 8, includes the following steps.

Step 801: Generate DCI, where when there is simultaneously in a network a paging message for an idle-state terminal and a change of system information, the DCI carries PDSCH scheduling information for the paging message and a short message; otherwise, the DCI carries the scheduling information or the short message, where the short message is used to indicate the change of system information.

Step 802: Transmit the DCI on a PDCCH.

Optionally, the DCI further includes indication information, and the indication information is used to indicate content carried in the DCI.

Optionally, the DCI includes a header field, and the header field includes the indication information.

The indication information indicates that the DCI carries at least one of the scheduling information or the short message; or a portion of bits in the indication information is used to indicate whether the DCI carries the scheduling information, and the other portion of bits is used to indicate whether the DCI carries the short message.

Optionally, the DCI carries the short message, and the indication information is used to indicate whether the DCI carries the scheduling information.

Optionally, the DCI includes K1 bits; and if the indication information indicates that the DCI carries the scheduling information, the K1 bits are used to indicate the scheduling information; or if the indication information indicates that the DCI does not carry the scheduling information, the K1 bits are reserved bits, where K1 is an integer greater than or equal to 1.

Optionally, the DCI includes a header field, the header field includes the indication information, and the indication information is used to indicate that the DCI carries one of the short message and the scheduling information; and if the DCI further carries the other one of the short message and the scheduling information, the other one of the short message and the scheduling information is indicated by using Kx bits in the DCI, where Kx is an integer greater than or equal to 1.

Optionally, if the indication information indicates that the DCI carries the short message, and K2 bits in the DCI are not a specific code point, the K2 bits are used to indicate the scheduling information; and if the K2 bits are the specific code point, it indicates that the DCI does not carry the scheduling information, where K2 is an integer greater than or equal to 1; or if the indication information indicates that the DCI carries the short message, the DCI includes a first indication bit, where the first indication bit is used to indicate whether the DCI carries the scheduling information; if the first indication bit indicates that the DCI carries the scheduling information, K3 bits in the DCI are used to indicate the scheduling information, where K3 is an integer greater than or equal to 1; or if the indication information indicates that the DCI carries the scheduling information, M1 bits in the DCI are used to indicate the short message, where M1 is an integer greater than or equal to 1; or if the indication information indicates that the DCI carries the scheduling information, the DCI includes a second indication bit, where the second indication bit is used to indicate whether the DCI carries the short message; and if the second indication bit indicates that the DCI carries the short message, M2 bits in the DCI are used to indicate the short message, where M2 is an integer greater than or equal to 1.

Optionally, the DCI carries the short message, and the DCI further includes K4 bits; if the K4 bits are not a specific code point, the K4 bits are used to indicate the scheduling information; and if the K4 bits are the specific code point, it indicates that the DCI does not carry the scheduling information, where K4 is an integer greater than or equal to 1.

Optionally, the remaining bits in the DCI are reserved bits.

Optionally, the change of system information includes at least one of a change of ordinary system information or a change of public safety system information.

If there are remaining bits in the short message, the remaining bits are reserved bits.

Optionally, the scheduling information or the DCI carries indication information, and the indication information is used to indicate whether the paging message carries a change indication of system information.

It should be noted that this embodiment is used as an implementation of the base station corresponding to the embodiments shown in FIG. 2 and FIG. 3. For a specific implementation of this embodiment, reference may be made to the related descriptions of the embodiments shown in FIG. 2 and FIG. 3, and a same beneficial effect is achieved. To avoid repetition, details are not described herein again.

Figure 9:
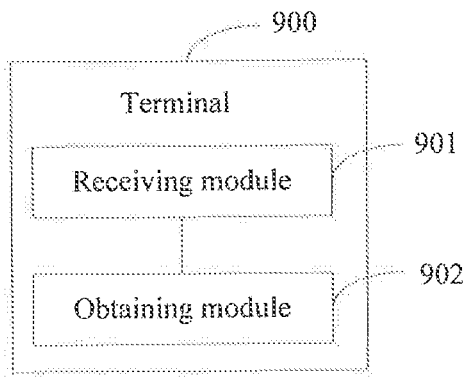
FIG. 9 is a structural diagram of a terminal according to an embodiment of this disclosure.

Referring to FIG. 9, FIG. 9 is a structural diagram of a terminal according to an embodiment of this disclosure. As shown in FIG. 9, the terminal 900 includes:

a receiving module 901, configured to receive DCI, where when there is simultaneously in a network a paging message for an idle-state terminal and a change of system information, the DCI carries PDSCH scheduling information for the paging message and a short message; otherwise, the DCI carries the scheduling information or the short message, where the short message is used to indicate the change of system information; and an obtaining module 902, configured to obtain at least one of the scheduling information or the short message from the DCI.

Optionally, the DCI further includes indication information, and the indication information is used to indicate content carried in the DCI.

Optionally, the DCI includes a header field, and the header field includes the indication information.

The indication information indicates that the DCI carries at least one of the scheduling information or the short message; or a portion of bits in the indication information is used to indicate whether the DCI carries the scheduling information, and the other portion of bits is used to indicate whether the DCI carries the short message.

Optionally, the DCI carries the short message, and the indication information is used to indicate whether the DCI carries the scheduling information.

Optionally, the DCI includes K1 bits; and if the indication information indicates that the DCI carries the scheduling information, the K1 bits are used to indicate the scheduling information; or if the indication information indicates that the DCI does not carry the scheduling information, the K1 bits are reserved bits, where K1 is an integer greater than or equal to 1.

Optionally, the DCI includes a header field, the header field includes the indication information, and the indication information is used to indicate that the DCI carries one of the short message and the scheduling information; and if the DCI further carries the other one of the short message and the scheduling information, the other one of the short message and the scheduling information is indicated by using Kx bits in the DCI, where Kx is an integer greater than or equal to 1.

Optionally, if the indication information indicates that the DCI carries the short message, and K2 bits in the DCI are not a specific code point, the K2 bits are used to indicate the scheduling information; and if the K2 bits are the specific code point, it indicates that the DCI does not carry the scheduling information, where K2 is an integer greater than or equal to 1; or if the indication information indicates that the DCI carries the short message, the DCI includes a first indication bit, where the first indication bit is used to indicate whether the DCI carries the scheduling information; if the first indication bit indicates that the DCI carries the scheduling information, K3 bits in the DCI are used to indicate the scheduling information, where K3 is an integer greater than or equal to 1; or if the indication information indicates that the DCI carries the scheduling information, M1 bits in the DCI are used to indicate the short message, where M1 is an integer greater than or equal to 1; or if the indication information indicates that the DCI carries the scheduling information, the DCI includes a second indication bit, where the second indication bit is used to indicate whether the DCI carries the short message; and if the second indication bit indicates that the DCI carries the short message, M2 bits in the DCI are used to indicate the short message, where M2 is an integer greater than or equal to 1.

Optionally, the DCI carries the short message, and the DCI further includes K4 bits; if the K4 bits are not a specific code point, the K4 bits are used to indicate the scheduling information; and if the K4 bits are the specific code point, it indicates that the DCI does not carry the scheduling information, where K4 is an integer greater than or equal to 1.

Optionally, the remaining bits in the DCI are reserved bits.

Optionally, the change of system information includes at least one of a change of ordinary system information or a change of public safety system information.

If there are remaining bits in the short message, the remaining bits are reserved bits.

Optionally, the scheduling information or the DCI carries indication information, and the indication information is used to indicate whether the paging message carries a change indication of system information.

The terminal provided in this embodiment of this disclosure can implement various processes implemented by the terminal in the method embodiments of FIG. 2 and FIG. 3. To avoid repetition, details are not described herein again. Signaling transmission overheads can be reduced, and the following effects can be achieved: a delay for obtaining an update indication of system information by the idle-state terminal and the connected-state terminal can be reduced, and a delay for paging the idle-state terminal can be further reduced.

Figure 10:
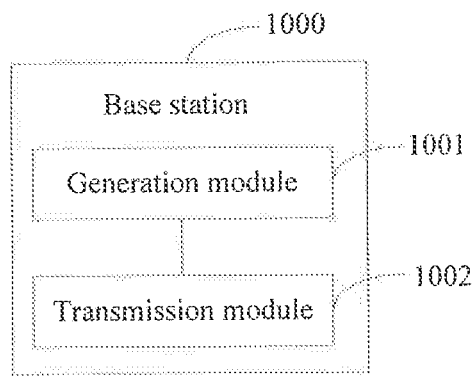
FIG. 10 is a structural diagram of a base station according to an embodiment of this disclosure.

Referring to FIG. 10, FIG. 10 is a structural diagram of a base station according to an embodiment of this disclosure. As shown in FIG. 10, the base station 1000 includes:

a generation module 1001, configured to generate DCI, where when there is simultaneously in a network a paging message for an idle-state terminal and a change of system information, the DCI carries PDSCH scheduling information for the paging message and a short message; otherwise, the DCI carries the scheduling information or the short message, where the short message is used to indicate the change of system information; and a transmission module 1002, configured to transmit the DCI on a PDCCH.

Optionally, the DCI further includes indication information, and the indication information is used to indicate content carried in the DCI.

Optionally, the DCI includes a header field, and the header field includes the indication information.

The indication information indicates that the DCI carries at least one of the scheduling information or the short message; or a portion of bits in the indication information is used to indicate whether the DCI carries the scheduling information, and the other portion of bits is used to indicate whether the DCI carries the short message.

Optionally, the DCI carries the short message, and the indication information is used to indicate whether the DCI carries the scheduling information.

Optionally, the DCI includes K1 bits; and if the indication information indicates that the DCI carries the scheduling information, the K1 bits are used to indicate the scheduling information; or if the indication information indicates that the DCI does not carry the scheduling information, the K1 bits are reserved bits, where K1 is an integer greater than or equal to 1.

Optionally, the DCI includes a header field, the header field includes the indication information, and the indication information is used to indicate that the DCI carries one of the short message and the scheduling information; and if the DCI further carries the other one of the short message and the scheduling information, the other one of the short message and the scheduling information is indicated by using Kx bits in the DCI, where Kx is an integer greater than or equal to 1.

Optionally, if the indication information indicates that the DCI carries the short message, and K2 bits in the DCI are not a specific code point, the K2 bits are used to indicate the scheduling information; and if the K2 bits are the specific code point, it indicates that the DCI does not carry the scheduling information, where K2 is an integer greater than or equal to 1; or if the indication information indicates that the DCI carries the short message, the DCI includes a first indication bit, where the first indication bit is used to indicate whether the DCI carries the scheduling information; if the first indication bit indicates that the DCI carries the scheduling information, K3 bits in the DCI are used to indicate the scheduling information, where K3 is an integer greater than or equal to 1; or if the indication information indicates that the DCI carries the scheduling information, M1 bits in the DCI are used to indicate the short message, where M1 is an integer greater than or equal to 1; or if the indication information indicates that the DCI carries the scheduling information, the DCI includes a second indication bit, where the second indication bit is used to indicate whether the DCI carries the short message; and if the second indication bit indicates that the DCI carries the short message, M2 bits in the DCI are used to indicate the short message, where M2 is an integer greater than or equal to 1.

Optionally, the DCI carries the short message, and the DCI further includes K4 bits; if the K4 bits are not a specific code point, the K4 bits are used to indicate the scheduling information; and if the K4 bits are the specific code point, it indicates that the DCI does not carry the scheduling information, where K4 is an integer greater than or equal to 1.

Optionally, the remaining bits in the DCI are reserved bits.

Optionally, the change of system information includes at least one of a change of ordinary system information or a change of public safety system information.

If there are remaining bits in the short message, the remaining bits are reserved bits.

Optionally, the scheduling information or the DCI carries indication information, and the indication information is used to indicate whether the paging message carries a change indication of system information.

The base station provided in this embodiment of this disclosure can implement various processes implemented by the base station in the method embodiment of FIG. 8. To avoid repetition, details are not described herein again. Signaling transmission overheads can be reduced, and the following effects can be achieved: a delay for obtaining an update indication of system information by the idle-state terminal and the connected-state terminal can be reduced, and a delay for paging the idle-state terminal can be further reduced.

Figure 11:
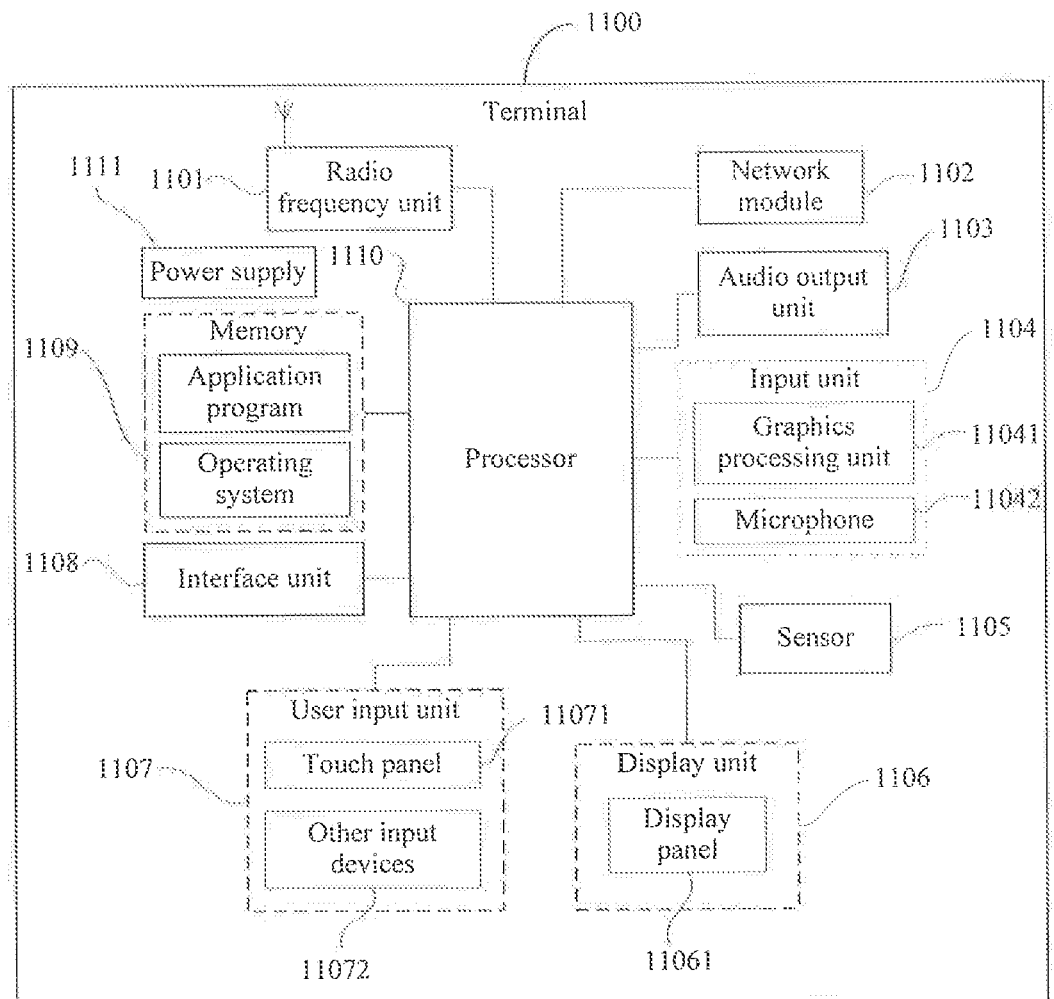
FIG. 11 is a structural diagram of another terminal according to an embodiment of this disclosure.

FIG. 11 is a schematic diagram of a hardware structure of a terminal for implementing the embodiments of this disclosure.

The terminal 1100 includes but is not limited to components such as a radio frequency unit 1101, a network module 1102, an audio output unit 1103, an input unit 1104, a sensor 1105, a display unit 1106, a user input unit 1107, an interface unit 1108, a memory 1109, a processor 1110, and a power supply 1111. Persons skilled in the art can understand that a structure of the terminal shown in FIG. 11 does not constitute any limitation on the terminal, and the terminal may include more or fewer components than those shown in the figure, or a combination of some of the components, or a different arrangement of the components. In this embodiment of this disclosure, the terminal includes but is not limited to a mobile phone, a tablet computer, a laptop computer, a palmtop computer, an in-vehicle terminal, a wearable device, a pedometer, and the like.

The radio frequency unit 1101 is configured to receive DCI, where when there is simultaneously in a network a paging message for an idle-state terminal and a change of system information, the DCI carries PDSCH scheduling information for the paging message and a short message; otherwise, the DCI carries the scheduling information or the short message, where the short message is used to indicate the change of system information.

The processor 1110 is configured to obtain at least one of the scheduling information or the short message from the DCI.

Optionally, the DCI further includes indication information, and the indication information is used to indicate content carried in the DCI.

Optionally, the DCI includes a header field, and the header field includes the indication information.

The indication information indicates that the DCI carries at least one of the scheduling information or the short message; or a portion of bits in the indication information is used to indicate whether the DCI carries the scheduling information, and the other portion of bits is used to indicate whether the DCI carries the short message.

Optionally, the DCI carries the short message, and the indication information is used to indicate whether the DCI carries the scheduling information.

Optionally, the DCI includes K1 bits; and if the indication information indicates that the DCI carries the scheduling information, the K1 bits are used to indicate the scheduling information; or if the indication information indicates that the DCI does not carry the scheduling information, the K1 bits are reserved bits, where K1 is an integer greater than or equal to 1.

Optionally, the DCI includes a header field, the header field includes the indication information, and the indication information is used to indicate that the DCI carries one of the short message and the scheduling information; and if the DCI further carries the other one of the short message and the scheduling information, the other one of the short message and the scheduling information is indicated by using Kx bits in the DCI, where Kx is an integer greater than or equal to 1.

Optionally, if the indication information indicates that the DCI carries the short message, and K2 bits in the DCI are not a specific code point, the K2 bits are used to indicate the scheduling information; and if the K2 bits are the specific code point, it indicates that the DCI does not carry the scheduling information, where K2 is an integer greater than or equal to 1; or if the indication information indicates that the DCI carries the short message, the DCI includes a first indication bit, where the first indication bit is used to indicate whether the DCI carries the scheduling information; if the first indication bit indicates that the DCI carries the scheduling information, K3 bits in the DCI are used to indicate the scheduling information, where K3 is an integer greater than or equal to 1; or if the indication information indicates that the DCI carries the scheduling information, M1 bits in the DCI are used to indicate the short message, where M1 is an integer greater than or equal to 1; or if the indication information indicates that the DCI carries the scheduling information, the DCI includes a second indication bit, where the second indication bit is used to indicate whether the DCI carries the short message; and if the second indication bit indicates that the DCI carries the short message, M2 bits in the DCI are used to indicate the short message, where M2 is an integer greater than or equal to 1.

Optionally, the DCI carries the short message, and the DCI further includes K4 bits; if the K4 bits are not a specific code point, the K4 bits are used to indicate the scheduling information; and if the K4 bits are the specific code point, it indicates that the DCI does not carry the scheduling information, where K4 is an integer greater than or equal to 1.

Optionally, the remaining bits in the DCI are reserved bits.

Optionally, the change of system information includes at least one of a change of ordinary system information or a change of public safety system information;

If there are remaining bits in the short message, the remaining bits are reserved bits.

Optionally, the scheduling information or the DCI carries indication information, and the indication information is used to indicate whether the paging message carries a change indication of system information.

The foregoing terminal can reduce signaling transmission overheads, and can also achieve the effects of reducing a delay for obtaining an update indication of system information by the idle-state terminal and the connected-state terminal, and further reducing a delay for paging the idle-state terminal.

It should be understood that in an embodiment of this disclosure, the radio frequency unit 1101 may be configured to: receive and send signals in an information receiving/sending process or a call process; and specifically, after receiving downlink data from a base station, send the downlink information to the processor 1110 for processing, and in addition, send uplink data to the base station. Usually, the radio frequency unit 1101 includes but is not limited to an antenna, at least one amplifier, a transceiver, a coupler, a low noise amplifier, a duplexer, and the like. In addition, the radio frequency unit 1101 may further communicate with a network and another device through a wireless communications system.

The terminal provides a user with wireless broadband internet access through the network module 1102, for example, helping the user to send or receive an e-mail, to browse a web page, or to access streaming media.

The audio output unit 1103 may convert audio data received by the radio frequency unit 1101 or the network module 1102 or stored in the memory 1109 into an audio signal and output the audio signal as a sound. The audio output unit 1103 may also provide audio output (for example, a call signal received sound or a message received sound) related to a specific function performed by the terminal 1100. The audio output unit 1103 includes a speaker, a buzzer, a receiver, and the like.

The input unit 1104 is configured to receive an audio or video signal. The input unit 1104 may include a graphics processing unit (Graphics Processing Unit, GPU) 11041 and a microphone 11042, and the graphics processing unit 11041 processes image data of a still picture or a video obtained by an image capture apparatus (for example, a camera) in an image capture mode or a video capture mode. A processed image frame may be displayed on the display unit 1106. An image frame processed by the graphics processing unit 11041 may be stored in the memory 1109 (or other storage media) or sent by the radio frequency unit 1101 or the network module 1102. The microphone 11042 can receive a sound and can process the sound into audio data. The processed audio data can be converted into a format that can be sent to a mobile communication base station through the radio frequency unit 601 in a telephone call mode, for outputting.

The terminal 1100 may further include at least one sensor 1105 such as a light sensor, a motion sensor, and other sensors. Specifically, the light sensor includes an ambient light sensor and a proximity sensor, where the ambient light sensor can adjust luminance of a display panel 11061 based on brightness of ambient light, and the proximity sensor can turn off the display panel 11061 and/or backlight when the terminal 1100 is moved to an ear. As a type of motion sensor, an accelerometer sensor can detect magnitudes of accelerations in all directions (usually three axes), can detect a magnitude and a direction of gravity when the mobile phone is in a static state, and can be applied to terminal posture recognition (such as screen switching between portrait and landscape, related games, and magnetometer posture calibration), functions related to vibration recognition (such as pedometer and tapping), and the like. The sensor 1105 may also include a fingerprint sensor, a pressure sensor, an iris sensor, a molecular sensor, a gyroscope, a barometer, a hygrometer, a thermometer, an infrared sensor, and the like. Details are not described herein.

The display unit 1106 is configured to display information input by the user or information provided for the user. The display unit 1106 may include a display panel 11061, and the display panel 11061 may be configured in a form of a liquid crystal display (Liquid Crystal Display, LCD), an organic light-emitting diode (Organic Light-Emitting Diode, OLED), or the like.

The user input unit 1107 may be configured to receive input digital or character information and generate key signal input related to user setting and function control of the terminal. Specifically, the user input unit 1107 may include a touch panel 11071 and other input devices 11072. The touch panel 11071, also referred to as a touchscreen, may capture a touch operation performed by a user on or near the touch panel (for example, an operation performed by the user on the touch panel 11071 or near the touch panel 11071 by using any appropriate object or accessory such as a finger or a stylus). The touch panel 11071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 1110, and receives and executes a command sent by the processor 1110. In addition, the touch panel 11071 may be implemented in a plurality of forms, for example, as a resistive, capacitive, infrared, or surface acoustic wave touch panel. The user input unit 1107 may further include other input devices 11072 in addition to the touch panel 11071. Specifically, the other input devices 11072 may include but are not limited to a physical keyboard, a function key (such as a volume control key or a power on/off key), a trackball, a mouse, and a joystick. Details are not described herein.

Further, the touch panel 11071 may cover the display panel 11061. After detecting a touch operation on or near the touch panel 11071, the touch panel 6071 transmits information about the touch operation to the processor 1110 for the processor 1110 to determine a touch event type, and then the processor 610 provides a corresponding visual output on the display panel 11061 based on the touch event type. Although in FIG. 11, the touch panel 11071 and the display panel 11061 act as two independent parts to implement input and output functions of the terminal, in some embodiments, the touch panel 11071 and the display panel 11061 may be integrated to implement the input and output functions of the terminal. This is not specifically limited herein.

The interface unit 1108 is an interface between an external apparatus and the terminal 1100. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 1108 may be configured to: receive input (for example, data information and power) from the external apparatus, and transmit the received input to one or more elements in the terminal 1100, or may be configured to transmit data between the terminal 1100 and the external apparatus.

The memory 1109 may be configured to store a software program and various data. The memory 1109 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 1109 may include a high-speed random access memory, or may include a non-volatile memory, for example, at least one magnetic disk storage device, a flash memory device, or other volatile solid-state storage devices.

The processor 1110 is a control center of the terminal, and is configured to: connect various parts of the entire terminal by using various interfaces or lines, and perform various functions of the terminal and process data by running or executing software programs and/or modules stored in the memory 1109 and calling data stored in the memory 1109, so as to perform overall monitoring on the terminal. The processor 1110 may include one or more processing units. Optionally, an application processor and a modem processor may be integrated into the processor 1110. The application processor mainly processes an operating system, a user interface, an application program, and the like. The modem processor mainly processes wireless communication. It can be understood that the modem processor may alternatively not be integrated in the processor 1110.

The terminal 1100 may further include the power supply 1111 (such as a battery) for supplying power to all components. Optionally, the power supply 1111 may be logically connected to the processor 1110 through a power management system. In this way, functions such as charge management, discharge management, and power consumption management are implemented by using the power management system.

In addition, the terminal 1100 includes some functional modules that are not shown, details of which are not described herein.

Optionally, an embodiment of this disclosure further provides a terminal, including a processor 1110, a memory 1109, a computer program stored in the memory 1109 and capable of running on the processor 1110. When the computer program is executed by the processor 1110, the processes of the DCI transmission method embodiment are implemented, with the same technical effect achieved. To avoid repetition, details are not described herein again.

Figure 12:
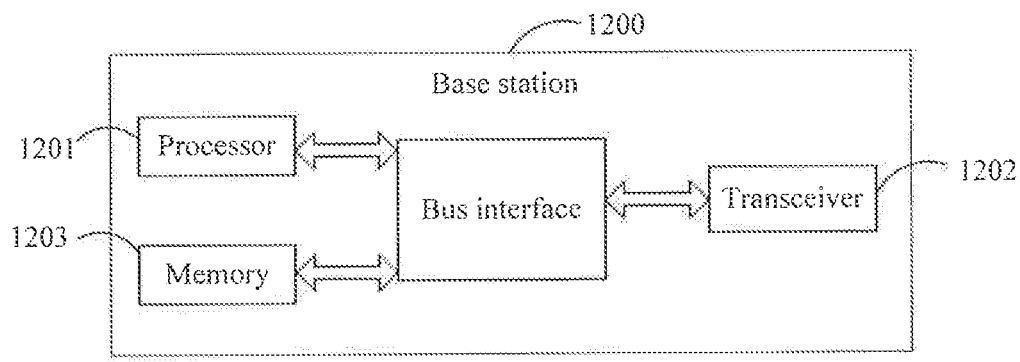
FIG. 12 is a structural diagram of another base station according to an embodiment of this disclosure.

Referring to FIG. 12, FIG. 12 is a structural diagram of another base station according to an embodiment of this disclosure. As shown in FIG. 12, the base station 1200 includes a processor 1201, a transceiver 1202, a memory 1203, and a bus interface.

The processor 1201 is configured to generate DCI, where when there is simultaneously in a network a paging message for an idle-state terminal and a change of system information, the DCI carries PDSCH scheduling information for the paging message and a short message; otherwise, the DCI carries the scheduling information or the short message, where the short message is used to indicate the change of system information.

The transceiver 1202 is configured to transmit the DCI on a PDCCH.

Optionally, the DCI further includes indication information, and the indication information is used to indicate content carried in the DCI.

Optionally, the DCI includes a header field, and the header field includes the indication information.

The indication information indicates that the DCI carries at least one of the scheduling information or the short message; or a portion of bits in the indication information is used to indicate whether the DCI carries the scheduling information, and the other portion of bits is used to indicate whether the DCI carries the short message.

Optionally, the DCI carries the short message, and the indication information is used to indicate whether the DCI carries the scheduling information.

Optionally, the DCI includes K1 bits; and if the indication information indicates that the DCI carries the scheduling information, the K1 bits are used to indicate the scheduling information; or if the indication information indicates that the DCI does not carry the scheduling information, the K1 bits are reserved bits, where K1 is an integer greater than or equal to 1.

Optionally, the DCI includes a header field, the header field includes the indication information, and the indication information is used to indicate that the DCI carries one of the short message and the scheduling information; and if the DCI further carries the other one of the short message and the scheduling information, the other one of the short message and the scheduling information is indicated by using Kx bits in the DCI, where Kx is an integer greater than or equal to 1.

Optionally, if the indication information indicates that the DCI carries the short message, and K2 bits in the DCI are not a specific code point, the K2 bits are used to indicate the scheduling information; and if the K2 bits are the specific code point, it indicates that the DCI does not carry the scheduling information, where K2 is an integer greater than or equal to 1; or if the indication information indicates that the DCI carries the short message, the DCI includes a first indication bit, where the first indication bit is used to indicate whether the DCI carries the scheduling information; if the first indication bit indicates that the DCI carries the scheduling information, K3 bits in the DCI are used to indicate the scheduling information, where K3 is an integer greater than or equal to 1; or if the indication information indicates that the DCI carries the scheduling information, M1 bits in the DCI are used to indicate the short message, where M1 is an integer greater than or equal to 1; or if the indication information indicates that the DCI carries the scheduling information, the DCI includes a second indication bit, where the second indication bit is used to indicate whether the DCI carries the short message; and if the second indication bit indicates that the DCI carries the short message, M2 bits in the DCI are used to indicate the short message, where M2 is an integer greater than or equal to 1.

Optionally, the DCI carries the short message, and the DCI further includes K4 bits; if the K4 bits are not a specific code point, the K4 bits are used to indicate the scheduling information; and if the K4 bits are the specific code point, it indicates that the DCI does not carry the scheduling information, where K4 is an integer greater than or equal to 1.

Optionally, the remaining bits in the DCI are reserved bits.

Optionally, the change of system information includes at least one of a change of ordinary system information or a change of public safety system information;

If there are remaining bits in the short message, the remaining bits are reserved bits.

Optionally, the scheduling information or the DCI carries indication information, and the indication information is used to indicate whether the paging message carries a change indication of system information.

The foregoing base station can reduce signaling transmission overheads, and can also achieve the effects of reducing a delay for obtaining an update indication of system information by the idle-state terminal and the connected-state terminal, and further reducing a delay for paging the idle-state terminal.

The transceiver 1202 is configured to receive and send data under control of the processor 1201. The transceiver 1202 includes at least two antenna ports.

In FIG. 12, a bus architecture may include any quantity of interconnected buses and bridges, and specifically connect together various circuits of one or more processors represented by the processor 1201 and a memory represented by the memory 1203. The bus architecture may further connect, for example, a peripheral device or a voltage stabilizer to various other circuits such as a power management circuit. These are well known in the art, and therefore are not further described in this specification. A bus interface provides an interface. The transceiver 1202 may be a plurality of elements, including a transmitter and a receiver, and provides units configured to perform communication with various other apparatuses over a transmission medium. For different user equipment, a user interface may also be an interface that can be externally or internally connected to a required device. The connected device includes but is not limited to a keypad, a display, a speaker, a microphone, a joystick, and so on.

The processor 1201 is responsible for management of the bus architecture and general processing, and the memory 1203 may store data used by the processor 1201 when the processor 610 performs an operation.

Optionally, an embodiment of this disclosure further provides a base station, including a processor 1201, a memory 1203, a computer program stored in the memory 1203 and capable of running on the processor 1201. When the computer program is executed by the processor 1201, the processes of the DCI transmission method embodiment are implemented, with the same technical effect achieved. To avoid repetition, details are not described herein again.

An embodiment of this disclosure further provides a computer-readable storage medium. The computer-readable storage medium stores a computer program, and when the computer program is executed by a processor, the processes of the DCI transmission method on a terminal side provided in the embodiments of this disclosure are implemented, or when the computer program is executed by a processor, the processes of the DCI transmission method on a base station side provided in the embodiments of this disclosure are implemented, with the same technical effect achieved. To avoid repetition, details are not described herein again. The computer-readable storage medium is, for example, a read-only memory (Read-Only Memory, ROM), a random access memory (Random Access Memory, RAM), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. In most cases, the former is a more preferred implementation. Based on such an understanding, the technical solutions of this disclosure essentially, or the part contributing to the related art may be implemented in a form of a software product. The software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A downlink control information (DCI) transmission method, applied to a base station and comprising:
   generating DCI, wherein when there is simultaneously in a network a paging message for an idle-state terminal and a change of system information, the DCI carries physical downlink shared channel (PDSCH) scheduling information for the paging message and a short message; otherwise, the DCI carries the scheduling information or the short message, wherein the short message is used to indicate the change of system information; and
   transmitting the DCI on a physical downlink control channel (PDCCH).

2. The method according to claim 1, wherein the DCI further comprises indication information, and the indication information is used to indicate content carried in the DCI.

3. The method according to claim 2, wherein the DCI comprises a header field, and the header field comprises the indication information, wherein
   the indication information indicates that the DCI carries at least one of the scheduling information and the short message; or
   a portion of bits in the indication information is used to indicate whether the DCI carries the scheduling information, and the other portion of bits is used to indicate whether the DCI carries the short message.

4. The method according to claim 2, wherein the DCI carries the short message, and the indication information is used to indicate Whether the DCI carries the scheduling information.

5. The method according to claim 4, wherein the DCI comprises K1 bits; and if the indication information indicates that the DCI carries the scheduling information, the K1 bits are used to indicate the scheduling information; or if the indication information indicates that the DCI does not carry the scheduling information, the K1 bits are reserved bits, wherein K1 is an integer greater than or equal to 1.

6. The method according to claim 2, wherein the DCI comprises a header field, the header field comprises the indication information, and the indication information is used to indicate that the DCI carries one of the short message and the scheduling information; and if the DCI further carries the other one of the short message and the scheduling information, the other one of the short message and the scheduling information is indicated by using Kx bits in the DCI, wherein Kx is an integer greater than or equal to 1.

7. The method according to claim 6, wherein
if the indication information indicates that the DCI carries the short message, and K2 bits in the DCI are not a specific code point, the K2 bits are used to indicate the scheduling information; and if the K2 bits are the specific code point, it indicates that the DCI does not carry the scheduling information, wherein K2 is an integer greater than or equal to 1; or
if the indication information indicates that the DCI carries the short message, the DCI comprises a first indication bit, wherein the first indication bit is used to indicate whether the DCI carries the scheduling information; if the first indication bit indicates that the DCI carries the scheduling information, K3 bits in the DCI are used to indicate the scheduling information, wherein K3 is an integer greater than or equal to 1; or
if the indication information indicates that the DCI carries the scheduling information, M1 bits in the DCI are used to indicate the short message, wherein M1 is an integer greater than or equal to 1; or
if the indication information indicates that the DCI carries the scheduling information, the DCI comprises a second indication bit, wherein the second indication bit is used to indicate whether the DCI carries the short message; and if the second indication bit indicates that the DCI carries the short message, M2 bits in the DCI are used to indicate the short message, wherein M2 is an integer greater than or equal to 1.

8. The method according to claim 1, wherein the DCI carries the short message, and the DCI further comprises K4 bits; if the K4 bits are not a specific code point, the K4 bits are used to indicate the scheduling information; and if the K4 bits are the specific code point, it indicates that the DCI does not carry the scheduling information, wherein K4 is an integer greater than or equal to 1.

9. The method according to claim 1, wherein remaining bits in the DCI are reserved bits.

10. The method according to claim 1, wherein the change of system information comprises at least one of a change of ordinary system information and a change of public safety system information; and
if there are remaining bits in the short message, the remaining bits are reserved bits.

11. The method according to claim 1, wherein the scheduling information or the DCI carries indication information, and the indication information is used to indicate whether the paging message carries a change indication of system information.

12. A non-transitory computer-readable storage medium, storing a computer program, wherein the computer program, when being executed by a processor, causes the processor to implement the following steps:
generating downlink control information (DCI), wherein when there is simultaneously in a network a paging message for an idle-state terminal and a change of system information, the DCI carries physical downlink shared channel (PDSCH) scheduling information for the paging message and a short message; otherwise, the DCI carries the scheduling information or the short message, wherein the short message is used to indicate the change of system information; and
transmitting the DCI on a physical downlink control channel (PDCCH).

13. The non-transitory computer-readable storage medium according to claim 12, Wherein the DCI further comprises indication information, and the indication information is used to indicate content carried in the DCI.

14. The non-transitory computer-readable storage medium according to claim 13, wherein the DCI comprises a header field, and the header field comprises the indication information, wherein
the indication information indicates that the DCI carries at least one of the scheduling information and the short message; or
a portion of bits in the indication information is used to indicate whether the DCI carries the scheduling information, and the other portion of bits is used to indicate whether the DCI carries the short message.

15. The non-transitory computer-readable storage medium according to claim 13, wherein the DCI carries the short message, and the indication information is used to indicate whether the DCC carries the scheduling information.

16. A non-transitory computer-readable storage medium, storing a computer program, wherein the computer program, when being executed by a processor, causes the processor to implement the following steps:
receiving downlink control information (DCI), wherein when there is simultaneously in a network a paging message for an idle-state terminal and a change of system information, the DCI carries physical downlink shared channel (PDSCH) scheduling information for the paging message and a short message; otherwise, the DCI carries the scheduling information or the short message, Wherein the short message is used to indicate the change of system information; and
obtaining at least one of the scheduling information or the short message from the DCI.

17. The non-transitory computer-readable storage medium according to claim 16, wherein the DCI further comprises indication information, and the indication information is used to indicate content carried in the DCI.

18. The non-transitory computer-readable storage medium according to claim 17, wherein the DCI comprises a header field, and the header field comprises the indication information, wherein
the indication information indicates that the DCI carries at least one of the scheduling information or the short message; or
a portion of bits in the indication information is used to indicate whether the DCI carries the scheduling information, and the other portion of bits is used to indicate whether the DCI carries the short message.

19. The non-transitory computer-readable storage medium according to claim 17, wherein the DCI carries the short message, and the indication information is used to indicate whether the ICI carries the scheduling information.

20. The non-transitory computer-readable storage medium according to claim 17, wherein the DCI comprises a header field, the header field comprises the indication information, and the indication information is used to indicate that the DCI carries one of the short message and the scheduling information; and if the DCI further carries the other one of the short message and the scheduling information, the other one of the short message and the scheduling information is indicated by using Kx hits in the DCI, wherein Kx is an integer greater than or equal to 1.

* * * * *